US 8,654,122 B2

(12) United States Patent
Hasselgren et al.

(10) Patent No.: US 8,654,122 B2
(45) Date of Patent: Feb. 18, 2014

(54) METHOD, APPARATUS, AND COMPUTER PROGRAM PRODUCT FOR IMPROVED GRAPHICS PERFORMANCE

(75) Inventors: Jon Hasselgren, Bunkeflostrand (SE); Jacob Munkberg, Malmö (SE); Petrik Clarberg, Lund (SE); Tomas Akenine-Möller, Lund (SE)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 12/534,374

(22) Filed: Aug. 3, 2009

(65) Prior Publication Data

US 2010/0026684 A1    Feb. 4, 2010

(30) Foreign Application Priority Data

Jul. 30, 2008  (SE) ...................... 0801742

(51) Int. Cl.
*G06T 15/60*    (2006.01)
*G06T 15/00*    (2011.01)

(52) U.S. Cl.
USPC .......................... 345/426; 345/419

(58) Field of Classification Search
None
See application file for complete search history.

(56) References Cited

U.S. PATENT DOCUMENTS 7,068,272 B1 * 6/2006 Voorhies et al. ............. 345/422
7,400,325 B1 * 7/2008 Gimby et al. ................ 345/421

FOREIGN PATENT DOCUMENTS

WO    2008091198    7/2008

OTHER PUBLICATIONS

Hasselgren, Jon; Akenine-Moller, Tomas. "PCU: The Programmable Culling Unit". Jul. 2007. ACM Transactions of Graphics, vol. 26, No. 3, Article 92, p. 1-10.*
European Search Report and Written Opinion issued in corresponding EP patent application 09251870, dated Sep. 26, 2012 (16 pages).
Bartz, D., et al., "Tighter Bounding Volumes for Better Occlusion Culling Performance," Technical Report WSI-2005-13, Department of Computer Science, Jul. 2005, XP002682977, Universitat Tubingen ISSN: 0946-3852 (retrieved from the Internet:) URL:http://www.gris.uni-tuebingen.de/lehrstuhl./publikationen/show/2.html [retrieved on Sep. 5, 2012].
Govindaraju, N. K., et al., "Fast and Reliable Collision Culling Using Graphics Hardware," IEEE Trans. on Visualization and Computer Graphics, dated Mar. 1, 2006, vol. 12, No. 2, Mar. 1, 2006, pp. 143-154, XP2683722.
Hasselgren, J. , et al., "Automatic Pre-Tessellation Culling," ACM Transactions on Graphics, vol. 28, No. 2, Apr. 2009, XP002682979, ACM USA, ISSN: 0730-0301.

(Continued)

*Primary Examiner* — Joni Richer
*Assistant Examiner* — Michelle Chin
(74) *Attorney, Agent, or Firm* — Trop, Pruner & Hu, P.C.

(57) ABSTRACT

This relates to a generation of digitally represented graphics. A first representation of a group of vertices is received. A second representation of said group of vertices is determined based on said first representation. A first set of instructions is executed on said second representation of said group of vertices for providing a third representation of said group of vertices, said first set of instructions being associated with vertex position determination. The third representation of said group of vertices is subjected to a culling process.

19 Claims, 10 Drawing Sheets

(56) References Cited

OTHER PUBLICATIONS

Xinyum, Z., et al., "Continuous Collision Detection for Articulated Models Using Taylor Models and Temporal Culling," ACM Transactions on Graphics ACM USA, vol. 26, No. 3, Jul. 2007 pp. 15-1-15-10, XP002682978, ISSN: 0730-0301.

European Search Report for PCT/US2008/091198, dated Sep. 26, 2012 (4 pages).

Bartz, D., et al., "Tighter Bounding Volumes for Better Occlusion Culling Performance," Technical Report WSI-2005-13, Department of Computer Science.

Govindaraju, N.K., et al., "Fast and Reliable Collision Culling Using Graphics Hardware," IEEE Trans. on Visualization and Computer Graphics, vol. 12, No. 2, Mar. 1, 2006, pp. 143-154.

Hasselgren, J., et al., "Automatic Pre-Tessellation Culling," ACM Transactions on Graphics, vol. 28, No. 2, Apr. 2009.

Zhang, X., et al., "Continuous Collision Detection for Articulated Models Using Taylor Models and Temporal Culling," ACM Transactions on Graphics ACM USA, vol. 26, No. 3, Jul. 2007, pp. 15-1-15-10.

\* cited by examiner

Fig. 5

METHOD, APPARATUS, AND COMPUTER PROGRAM PRODUCT FOR IMPROVED GRAPHICS PERFORMANCE

BACKGROUND

The present invention relates to digitally represented graphics and more particularly to a method, an apparatus and a computer program product for improving the performance of generating digitally represented graphics.

Digitally represented graphics, such as computer graphics, is continuously improving in performance. In the 1980's and 1990's, display adapters for computers and game consoles appeared with graphics accelerators, offloading the Central Processing Unit (CPU) in graphics generation. Initially, the display adapters offered acceleration of 2D graphics, but eventually these also included support for accelerated 3D graphics. Modern display adapters use a processing unit named a graphics processing unit (GPU).

Due to the complexity of 3D graphics, GPUs of today use a significant amount of their processing power to perform calculations related to 3D graphics.

A continuous disadvantage with display adapters is performance. There are new applications and games requiring maintained frame rates (rendered screen images per second) with higher scene complexities, higher geometry detail, higher resolutions and higher image quality, resulting in requirements that each screen image should be rendered in a short a time as possible. In other words, it is often important to increase performance.

One known way to increase performance is to increase the processing power of the GPUs by enabling higher clock speeds, pipelining, or exploiting parallel computations. However, this often results in a higher power consumption and more generated heat. For battery-operated devices, a higher power consumption leads to a reduced battery life. Power consumption and heat are major constraint and bottlenecks for mobile devices and desktop display adapters. Moreover, there are limits to the clock speeds of each GPU.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION

Figure 1:
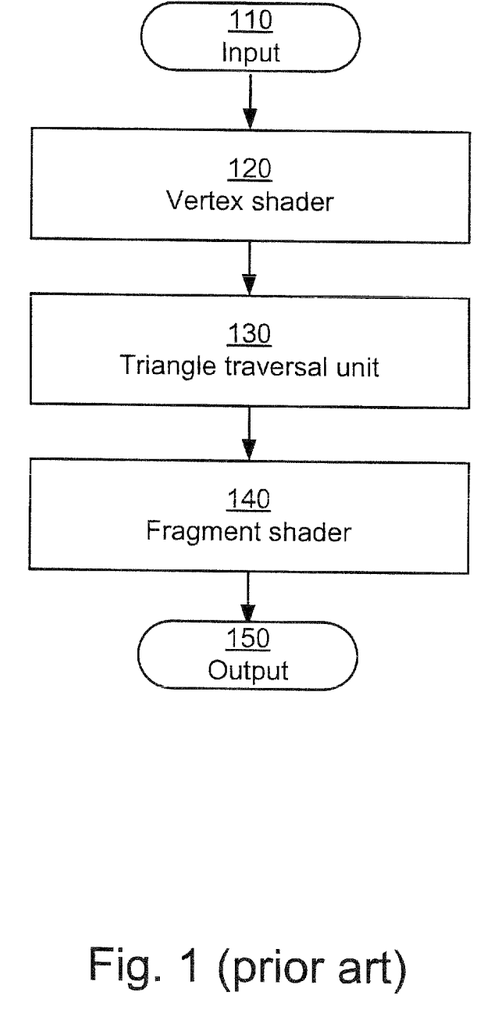
FIG. 1 is a block diagram illustrating how different entities, in a display adapter according to prior art, interact.

Embodiments of the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout. FIG. 1 is a block diagram illustrating how different entities, in a conventional display adapter known to a person skilled in the art, interact. A display adapter according to prior art may comprise a vertex shader 120, a triangle traversal unit 130, and a fragment shader 140. The entities of the display adapter according to prior art are well known to persons skilled in the art.

The input 110 to the vertex shader 120 is a vertex. In computer graphics, a vertex comprises data associated with a location in space. For example, a vertex may be all data associated with a corner of a primitive. The vertices are associated riot only with three spatial coordinates but also with other graphical information necessary to render objects correctly, such as colours, reflectance properties, textures, and surface normals. Each vertex may also be associated with other attributes, such as normals and texture coordinates.

A connected set of vertices can be used to define a primitive. A primitive may for example be a triangle, quadrilateral, polygon, or other geometric form or, alternatively, a primitive may for example be a surface or a point in space. A primitive that is represented as a triangle has for example three vertices and a quadrilateral has four vertices.

The vertex shader 120 comprises a set of instructions that are executed for each vertex. The set of instructions may for example comprise a simple matrix transform, a projective transform, a blend of matrix multiplications, textured and procedural displacement.

The triangle traversal unit 130 is responsible for setting up polygons as instructed by a connected controller. Although any polygon can be used, triangles are commonly used. For each polygon, the triangle traversal unit 130 divides the polygon to be rendered into one or more tiles, where each tile is at least partly overlapped by the polygon. In general, a tile is a two-dimensional rectangle comprising a number of fragments. Each of these fragments correspond to a pixel and comprise all data required to render the pixel and to test whether the pixel should be rendered on the screen. A common size of a tile is 8 by 8 fragments, although any tile size is possible.

Another important task of the triangle traversal unit 130 is to find the fragments that are inside the geometric primitive (e.g., triangle) being rendered. This can be done using a variety of techniques, the techniques being known to a person skilled in the art.

The fragment shader 140 executes a fragment shader program for each fragment passed to this unit. Each of these fragments correspond to a pixel and comprise data required to render the pixel and to test whether the pixel should be rendered on the screen. The fragment data may include at least one from the group of raster position, depth, colour, texture coordinates, stencil, or alpha (used for blending). For every pixel there may exist a plurality of fragment samples.

The fragments are further processed in order to for example combine a previously evaluated colour with textures, as well as to add effects such as fog, as well as to, when possible, identify fragments that do not need to be rendered, i.e. fragment culling.

The fragment shader 140 may further perform depth testing, alpha testing, and blending before the fragments are written to target buffers.

The output 150 from the display adapter according to prior art may be displayed on a display.

It is to be noted that from here on, an embodiment of the present invention will be described.

Different embodiments of an apparatus adapted to generate digitally represented graphics according to the invention will be described below with reference to FIG. 2. The apparatus comprises circuitry for improving performance of generation of digitally represented graphics. Said apparatus may be embodied as a display adapter and will for ease of understanding hereinafter be referred to as a display adapter.

FIG. 2a is a block diagram illustrating an embodiment of a display adapter 201 according to the present invention. The display adapter 201 comprises circuitry for improving performance of generation of digitally represented graphics, forming a vertex culling unit 214 for culling of groups of vertices.

The input 210 to the vertex culling unit 214 is a first representation of a group of vertices. A first representation of a group of vertices is herein to be interpreted as the vertices themselves.

In the vertex culling unit 214, culling is performed on groups of vertices and on representations of vertices. The output 222 from the vertex culling 214 unit may be that the group of vertices is to be discarded.

The details and effects of the culling are further described in conjunction with FIG. 3a-d, below.

The output 224 from the display adapter 201 may be displayed on a display.

The display adapter 201 can further comprise a vertex probing unit 212, see FIG. 2b. The vertex probing unit 212 is arranged to check if at least one vertex of the group of vertices can be culled. The at least one vertex can be the first, last, and/or middle vertex in the group of vertices. Alternatively, it can be randomly selected from the group of vertices. The vertex probing unit 212 may use a vertex shader according to prior art to transform the vertex. The vertex probing unit 212 then performs for example view frustum culling and checks if the at least one vertex is inside the view frustum, and if it is, it cannot be culled. It is however to be noted that other culling techniques known to a person skilled in the art could be used as well.

If the at least one vertex of the group of vertices cannot be culled it implies that the entire group of vertices cannot be culled and then it is better not to perform the culling in the vertex culling unit 214 on the entire group of vertices since this culling is capacity demanding.

The vertex culling unit 214, the input 210 to the vertex culling unit 214 and the output 224 from the display adapter 201 have been previously described in connection with FIG. 2a.

FIG. 2c is a block diagram illustrating how different entities in a display adapter 201 may interact in an embodiment of the present invention. The display adapter 201 comprises a vertex culling unit 214, a vertex shader 216, a triangle traversal unit 218, and a fragment shader 220. The entities 216, 218, and 220 may be of similar type as those described above with reference to FIG. 1.

The vertex culling unit 214, the input 210 to the vertex culling unit 214 and the output 224 from the display adapter 201 have been previously described in connection with FIG. 2a.

In one embodiment, the display adapter 201 of FIG. 2c can also comprise a vertex probing unit 212, which has been previously described in connection with FIG. 2b.

In yet another embodiment, see FIG. 2d, the display adapter 201 comprises a vertex culling unit 214, a vertex shader 216, a triangle traversal unit 218, a fragment culling unit 228, and a fragment shader 220. The entities 216, 218, and 220 may be of the same or similar type as those described above with reference to FIG. 1.

The vertex culling unit 214, the input 210 to the vertex culling unit 214 and the output 224 from the display adapter 201 have been previously described in connection with FIG. 2a.

In one embodiment, the display adapter 201 of FIG. 2d can also comprise a vertex probing unit 212, which has been previously described in connection with FIG. 2b.

In the fragment culling unit 228, culling is performed on tiles according to a replaceable culling program, also known as a replaceable culling module. The details of this culling program and the effects are explained in more detail in the International patent application PCT/SE2008/000055 (WO/20081091198, published Jul. 31, 2008), the content of which is hereby incorporated by reference.

The embodiment of FIG. 2d can also comprise a fragment probing unit 226. The fragment probing unit 226 is arranged to check if at least one pixel from a tile can be culled. The at least one pixel can for example be the centre pixel of the tile or the four corners of the tile. If the at least one pixel of the tile cannot be culled it implies that the tile cannot be culled and then it is better not to perform the culling in the fragment culling unit 228 since the culling may be capacity demanding.

In yet another embodiment, see FIG. 2e, the display adapter 201 comprises a base primitive culling unit 234, a vertex culling unit 214, a vertex shader 216, a triangle traversal unit 218, and a fragment shader 220. The entities 216, 218, and 220 may be of the same or similar type as those described above with reference to FIG. 1.

The vertex culling unit 214 and the output 224 from the display adapter 201 have been previously described in connection with FIG. 2a. The input 208 to the base primitive culling unit 234 is a base primitive. A geometric primitive in the field of computer graphics is usually interpreted as atomic geometric objects that the system can handle, for example draw or store. Atomic geometric objects may be interpreted as geometric objects that cannot be divided into smaller objects. All other graphics elements are built up from these primitives.

In one embodiment, the display adapter 201 of FIG. 2e can also comprise a vertex probing unit 212, which has been previously described in connection with FIG. 2b.

In the base primitive culling unit 234, culling is performed on base primitives according to a culling program. The details of this culling program and the effects are explained in more detail in the Swedish Patent Application No. 0800165-3, included as Appendix A, the content of which is hereby incorporated by reference.

The embodiment of FIG. 2e can also comprise a base primitive probing unit 232. The base primitive probing unit 232 is arranged to check if at least one vertex of a base primitive can be culled. At least one vertex from the base primitive is selected. The at least one vertex can for example be the vertices of the base primitive or the centre of the base primitive. If the at least one vertex of the base primitive cannot be culled it implies that the base primitive cannot be culled and then it is better not to perform the base primitive culling in the base primitive culling unit 234 since base primitive culling is capacity demanding.

In yet another embodiment, not shown in the figures, the display adapter 201 can comprise a base primitive probing unit 232, a base primitive culling unit 234, a vertex probing unit 212, a vertex culling unit 214, a vertex shader 216, a triangle traversal unit 218, a fragment probing unit 226, a fragment culling unit 223, and a fragment shader 220.

FIG. 3 shows a flow chart for a culling program that can be executed on a group of vertices in the vertex culling unit 214 of FIGS. 2a, b, c, d, and e.

Figure 3A:
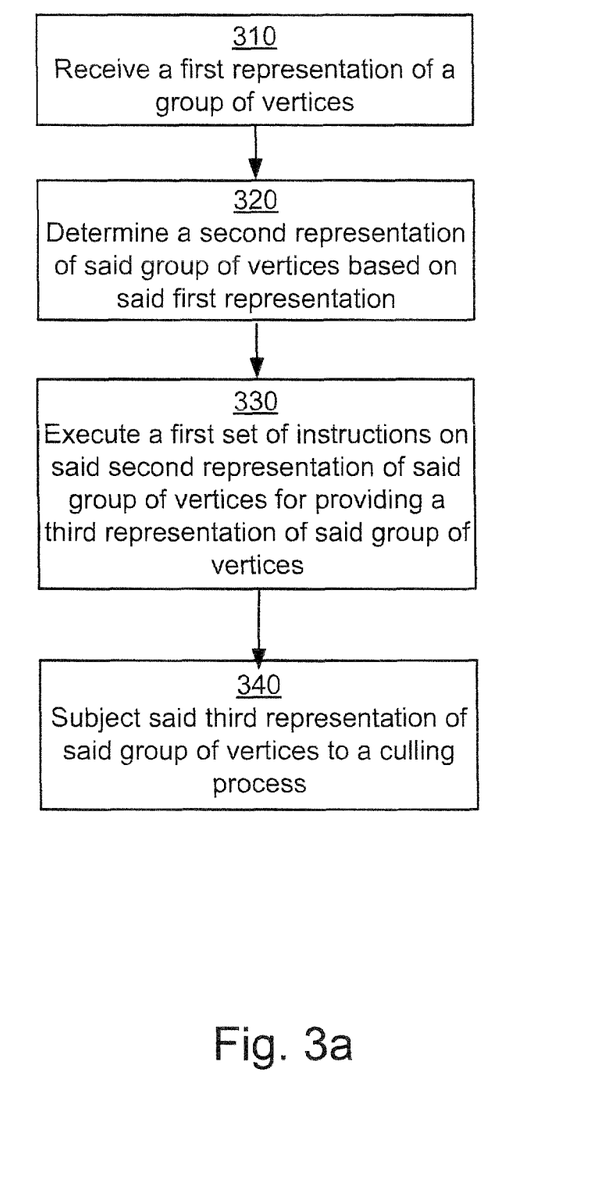
FIG. 3a-d are flowcharts showing culling processes that can be executed in the apparatus of FIGS. 2a-e.

In step 310, a first representation of a group of vertices is received. The received group of vertices may comprise vertices from at least two primitives.

The vertices to be input into the vertex shader 216 are gathered into groups using so called draw calls. A draw call comprises vertices and information about how the vertices are connected to create primitives, for example triangles.

The vertices in a draw call share a common rendering state, which implies that they are associated with the same vertex shader, and also with the same geometry shader, pixel shader and also other types of shaders. A rendering state describes how a particular type of object is rendered, including its material properties, associated shaders, textures, transform matrices, lights, etc. A rendering state could for example be used for rendering all primitives of a part of wood, a part of a man, the stem of a flower. All vertices in the same draw call can be used to render objects with the same material/appearance.

Usually many draw calls are needed in order to render an entire image. Draw calls are used because it is more efficient to render a relatively large set of primitives with the same states and shaders than to render one primitive at a time and having to switch shader program for each primitive. Another advantage with using draw calls is that overhead is avoided in the Application Programming Interface (API) and in the graphics hardware architecture.

In step 320, a second representation of said group of vertices is determined based on said first group of vertices. The second representation of said group of vertices can be computed using bounded arithmetic according to the following:

A three-dimensional model comprises k vertices, $p^i$, $i \in [0, k-1]$. The bounds of the x coordinates can for example be computed as: $\tilde{p}_x = [\min_i(p_x^i), \max_i(p_x^i)]$, i.e. the minimum and maximum of all x-coordinates of the vertices $p^i$, $i \in [0, k-1]$ are computed. This results in an interval: $\tilde{p}_x = [\underline{p}_x, \overline{p}_x]$. Such an interval can be computed for all other components of p and for all other varying parameters as well. It is to be noted that other types of computations can be applied instead in order to compute these bounds. In the example above, interval arithmetic is used. Affine arithmetic or Taylor arithmetic are other types of bounded arithmetic that could be used instead.

In step 330, a first set of instructions is executed on said second representation of said group of vertices for providing a third representation of said group of vertices. When executing the first set of instructions, bounded arithmetic can be used. The bounded arithmetic can for example be Taylor arithmetic, interval arithmetic, or affine arithmetic.

In one embodiment, one or more polynomials are fitted to the attributes of the group of vertices and Taylor models are constructed, wherein the polynomial part comprises the coefficients of the fitted polynomials, and the remainder term is adjusted so that the Taylor model includes all vertices in the group. Such an approach may give sharper bounds than when using interval arithmetic.

In step 340, said third representation of said group of vertices is subject to a culling process. Culling is performed in order to avoid drawing objects, or parts of objects, that are not seen.

Figure 2:
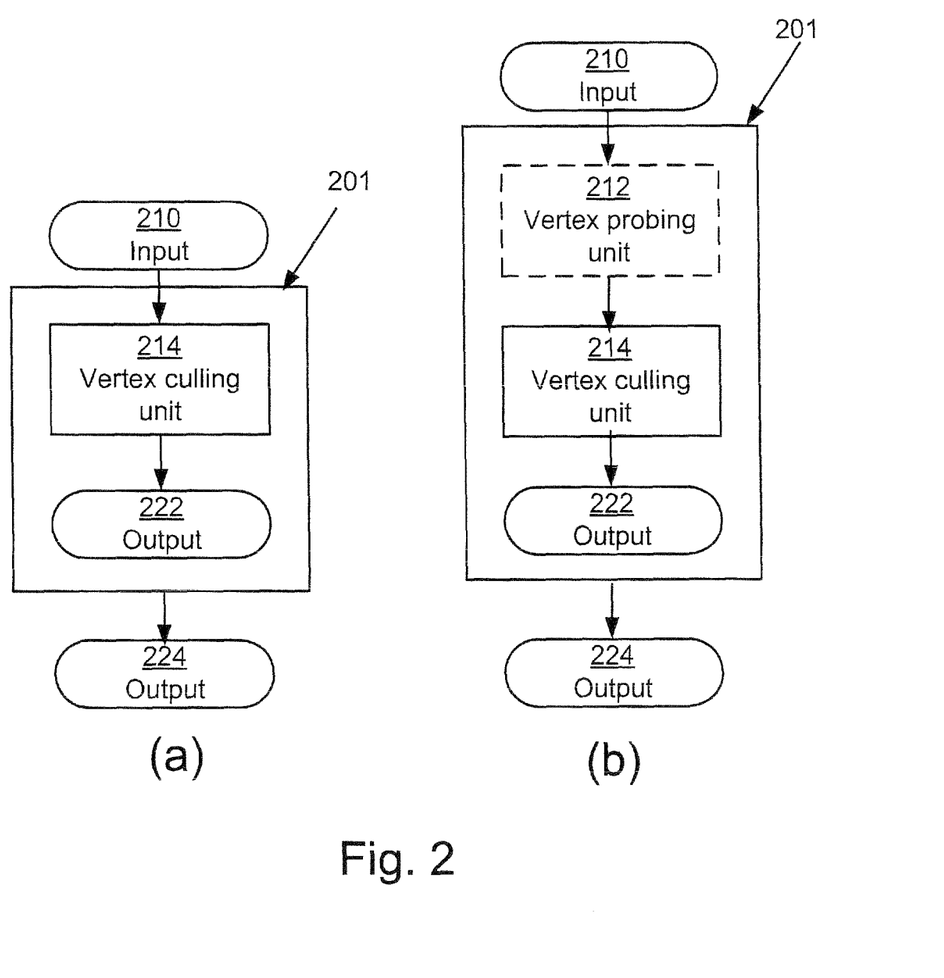
FIG. 2a is a block diagram illustrating how different entities in an apparatus may interact in an embodiment of the present invention.
FIG. 2b is a block diagram illustrating an embodiment of the present invention.
FIG. 2c is a block diagram illustrating an embodiment of the present invention.
FIG. 2d is a block diagram illustrating an embodiment of the present invention.
FIG. 2e is a block diagram illustrating an embodiment of the present invention.
Figure 3B:
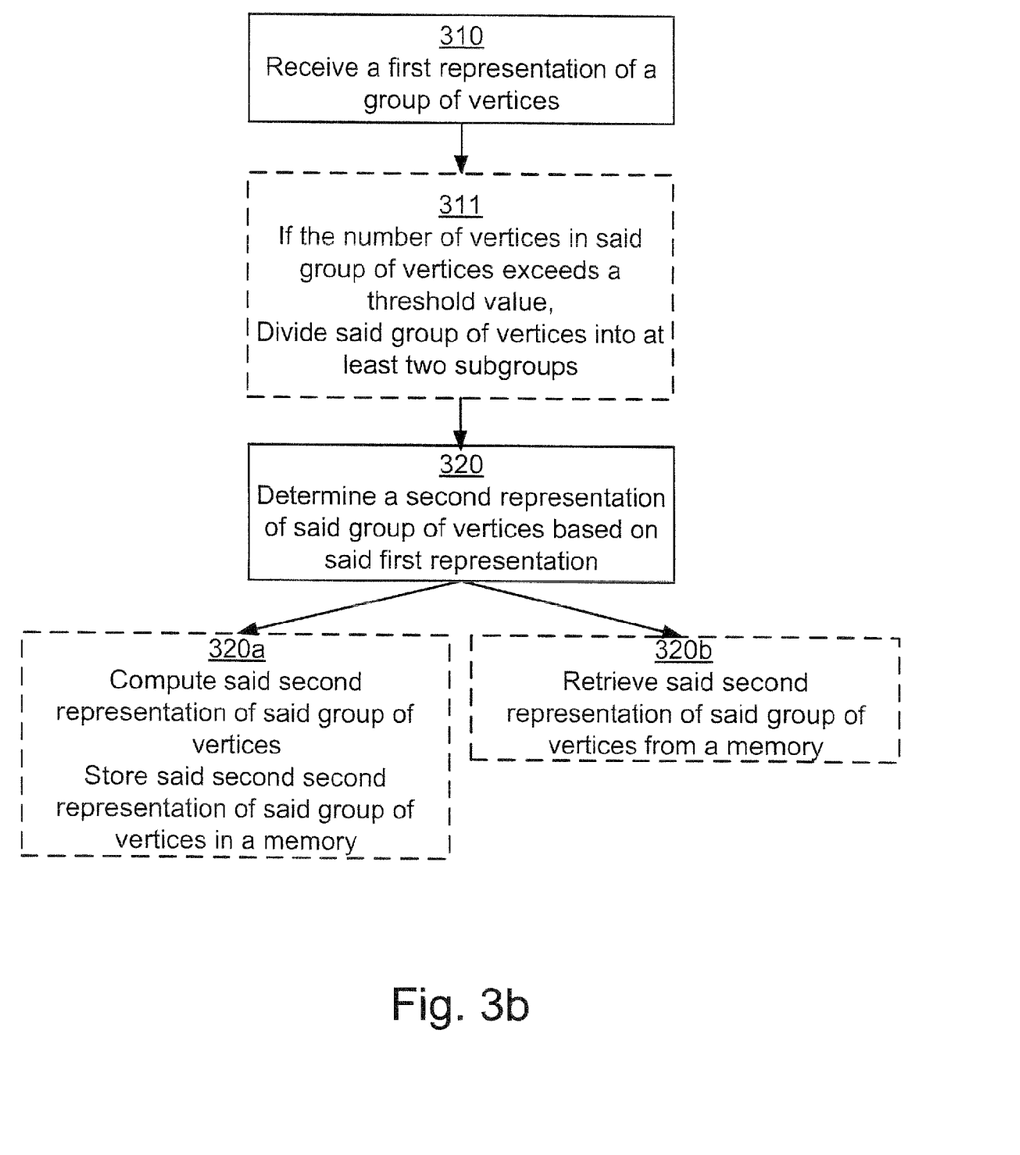
Figure 3C:
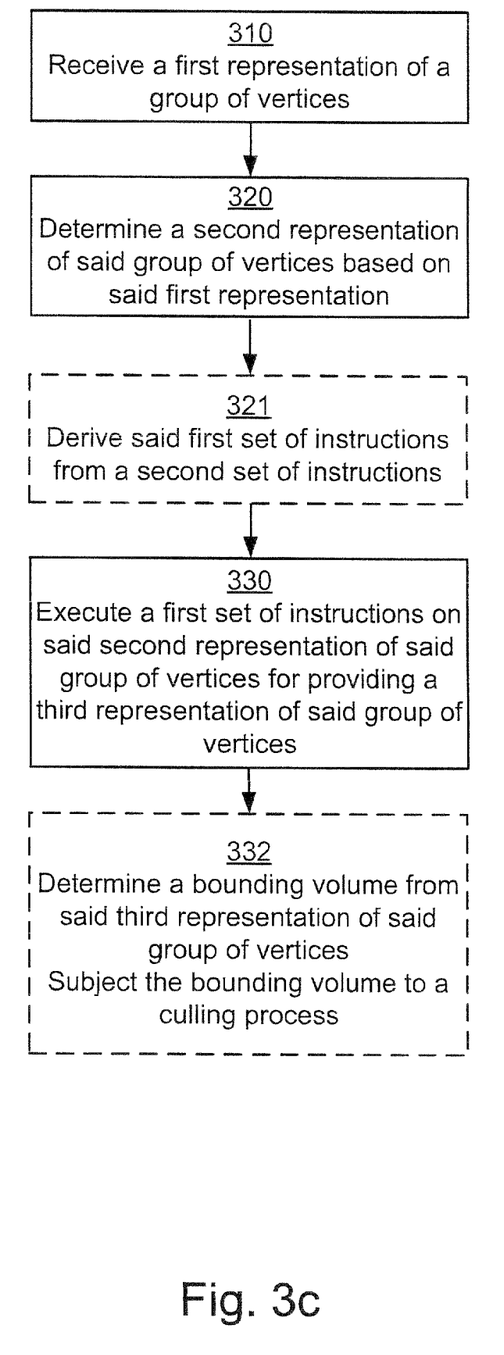
Figure 3D:
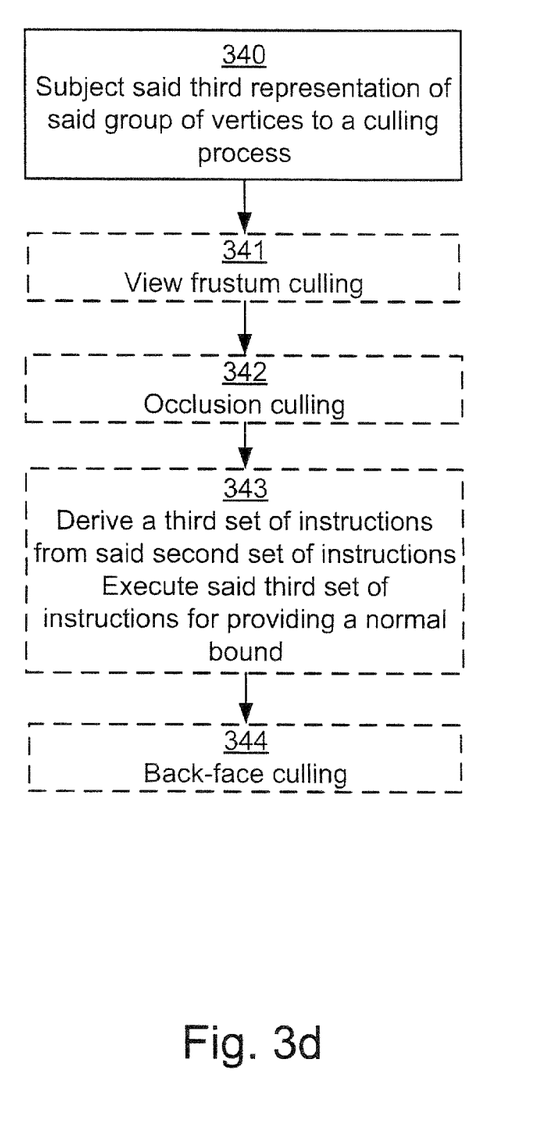

FIG. 3b-d show flow charts for different embodiments of a culling program according to FIG. 3a, that can be executed on a group of vertices in the vertex culling unit 214 of FIGS. 2a, b, c, d, and e.

The groups of vertices received in step 310 can be gathered in different ways. One way is to use the entire draw call which implies that the first representation of the group of vertices comprises all vertices in the draw call.

Another way is to gather the vertices of m primitives, where m is a constant. When using this alternative, the first representation of the group of vertices can span more than one draw call.

Another way is to gather the vertices according to step 311 see FIG. 3b: if the number of vertices in said group of vertices exceeds a threshold value, divide said group of vertices into at least two subgroups, wherein said at least two subgroups comprise vertices that are associated with the same set of instructions associated with vertex position determination. This way of gathering vertices is a combination of the two previously described ways. Using this way, a group may not span across more than one draw call and the size of the group may not be bigger than m.

Another way to gather the vertices comprises computing intervals enclosing for example the positions of the vertices. The intervals can be computed for other parameters as well such as for example colour. Vertices are added to the group until the intervals exceed a predetermined threshold.

In one embodiment, step 320 can comprise that the second representation of the group of vertices can be computed and then stored in a memory, step 320a FIG. 3b. The next time the second representation of the group of vertices is needed, it can be retrieved from the memory. This is capacity efficient since the computation does not have to be performed for every group of vertices. This solution is possible as long as the groups of vertices that are input are associated with the same set of instructions associated with vertex position determination and with the same vertex attributes. Vertex attributes can for example be vertex positions, normals, texture coordinates, etc.

In one embodiment, step 320 can comprise that the second representation of the group of vertices can be retrieved from a memory, step 320b FIG. 3b.

In one embodiment, the first set of instructions can be derived from a second set of instructions associated with vertex position determination, step 321 FIG. 3c. The second set of instructions associated with vertex position determination is herein to be interpreted as the instructions in a conventional vertex shader of prior art.

The set of instructions is then analysed and all instructions that are used to compute the vertex position are isolated. The instructions are redefined into operating on bounded arithmetic, for example Taylor arithmetic, interval arithmetic, affine arithmetic, or another suitable arithmetic known to a person skilled in the art.

Assume that a vertex in homogeneous coordinates is denoted, $P = (p_x, p_y, p_z, p_w)^T$ (where $p_w = 1$, usually), and $T$ is the transpose operator, i.e., column vectors are used. In the simplest form, a vertex shader program is a function that operates on a vertex, p, and computes a new position $P_d$. More generally, the vertex shader program is a function that operates on a vertex, p, and on a set of varying parameters, $t_i$, $i \in [0, n-1]$, see equation (1).

$$P = f(p, t, M) \qquad \text{equation (1)}$$

To simplify notation, all the $t_i$ parameters are put into a long vector, t. The parameters can for example be time, texture coordinates, normal vectors, textures, and more. The parameter, M, represents a collection of constant parameters, such as matrices, physical constants, and so on.

The vertex shader program may have many other outputs besides $P_d$, and therefore more inputs as well. In the following, it is assumed that the arguments (parameters) to $f$ are used in the computation of $P_d$.

When deriving the first set of instructions associated with vertex position determination, the vertex shader is reformulated so that the input is said second representation (for example interval bounds for the attributes of the group of vertices) and the output is bounds for the vertex positions, see equation (2).

$$\tilde{P}_d = \tilde{f}(\tilde{P}, \tilde{t}, M) \qquad \text{equation (2)}$$

A brief description of Taylor models follows in order to facilitate the understanding of the following steps.

Intervals are used in Taylor models, and the following notation is used for an interval:

$$\hat{a} = [\underline{a}, \overline{a}] = \{x \mid \underline{a} \le x \le \overline{a}\} \qquad \text{equation (3)}$$

Given an n+1 times differentiable function, $f(u)$, where $u \in [u_0, u_1]$, the Taylor model of $f$ is composed of a Taylor polynomial, $T_f$, and an interval remainder term, $\hat{r}_f$. An nth order Taylor model, here denoted $\tilde{f}$, over the domain $u \in [u_0, u_1]$ is then:

$$\tilde{f}(u) \in \sum_{k=0}^{n} \frac{f^{(k)}(u_0)}{k!} \cdot (u - u_0)^k + [\underline{r_f}, \overline{r_f}] = \sum_{k=0}^{n} c_k u^k + \hat{r}_f, \qquad \text{equation (4)}$$

$$\text{wherein} \sum_{k=0}^{n} \frac{f^{(k)}(u_0)}{k!} \cdot (u - u_0)^k$$

is the Taylor polynomial and $[\underline{r_f}, \overline{r_f}]$ is the interval remainder term. This representation is called a Taylor model, and is a conservative enclosure of the function $f$ over the domain $u \in [u_0, u_1]$. It is also possible to define arithmetic operators on Taylor models, where the result is a conservative enclosure as well (another Taylor model). As a simple example, assume that $f+g$ is to be computed, and that these functions are represented as Taylor models, $\tilde{f} = (T_f, \hat{r}_f)$ and $\tilde{g} = (T_g, \hat{r}_g)$. The Taylor model of the sum is then $(T_f + T_g, \hat{r}_f + \hat{r}_g)$. More complex operators like multiplication, sine, log, exp, reciprocal, etc., can also be derived. Implementation details for these operators are described in BERZ, M., AND HOFFSTÄTTER, G. 1998, Computation and Application of Taylor Polynomials with Interval Remainder Bounds, *Reliable Computing*, 4, 1, 83-97.

In one embodiment, the second representation of the group of vertices can be interval bounds for the vertex attributes, for example position and/or normal bounds. The first set of instructions may be executed using bounded arithmetic. In this embodiment, the third representation is a bounding volume. In one embodiment the bounding volume may be a bounding box. The third representation is for example determined by computing the minimum and maximum values for every vertex attribute.

In one embodiment, a bounding volume enclosing said third representation of said group of vertices is determined and said bounding volume is subject to a culling process, step 332 FIG. 3c.

A bounding volume for a set of objects is a closed volume that completely comprises the union of the objects in the set. Bounding volumes may be of various shapes, for example boxes such as cuboids or rectangles, spheres, cylinders, polytopes, and convex hulls.

The inventive bounding volume may be a tight bounding volume. The bounding volume being tight implies that the area or volume of the bounding volume is as small as possible but still completely enclosing said third representation of said group of vertices.

In one embodiment, the second representation of group of vertices are Taylor models of the vertex attributes. The first set of instructions are executed using Taylor arithmetic. The third representation of a group of vertices may be bounds that are computed from the second representation using the first set of instructions. These bounds may be computed for example according to what is disclosed in "Interval Approximation of Higher Order to the Ranges of Functions", Qun Lin and J. G. Rokne, Computers Math. Applic., vol 31, no. 7, pp. 101-109, 1996. In one embodiment, a bounding volume enclosing said third representation of said group of vertices is determined and said bounding volume is subject to a culling process.

In another embodiment, the first representation of the group of vertices can describe a parameterized surface (for example an already tessellated surface) that is parameterized by two coordinates, for example (u,v). In another embodiment, one or more polynomial models have been fitted to the attributes of the group of vertices.

In one embodiment, the third representation may be a Taylor model and can be a polynomial approximation of the vertex position attribute. More specifically, it may be positional bounds: $\tilde{p}(u,v) = (\tilde{p}_x, \tilde{p}_y, \tilde{p}_z, \tilde{p}_w)$, that is four Taylor models. For a single component, for example x, this can be expressed in the power basis as follows (the remainder term, $\hat{r}_f$, has been omitted for clarity):

$$p_x(u, v) = \sum_{i=j \le n} a_{ij} u^i v^j \qquad \text{equation (5)}$$

In one embodiment, said third representation of said group of vertices may be normal bounds. For a parameterized surface, the unnormalized normal, n, can be computed as:

$$n(u, v) = \frac{\partial p(u, v)}{\partial u} \times \frac{\partial p(u, v)}{\partial v} \qquad \text{equation (6)}$$

The normal bounds, that is the Taylor model of the normal, is then computed as $$\tilde{n}(u, v) = \frac{\partial \tilde{p}(u, v)}{\partial u} \times \frac{\partial \tilde{p}(u, v)}{\partial v} \qquad \text{equation (7)}$$

The third representation of the group of vertices may be Taylor polynomials on power form.

One way of determining the bounding volume may be by computing the derivatives of the Taylor polynomials and thus finding the minimum and maximum of the third representation.

Another way to determine the bounding volume may be according to the following. The Taylor polynomials are converted into Bernstein form. Due to the fact that the convex hull property of the Bernstein basis guarantees that the actual surface or curve of the polynomial lies inside the convex hull of the control points obtained in the Bernstein basis, the bounding volume is computed by finding the minimum and maximum control point value in each dimension. Transforming equation 5 into Bernstein basis gives:

$$p(u, v) = \sum_{i+j \leq n} p_{ij} B_{ij}^n(u, v) \quad \text{equation (8)}$$

$$\text{where } B_{ij}^n(u, v) = \binom{n}{i}\binom{n-i}{j} u^i v^j (1-u-v)^{n-i-j}$$

are the Bernstein polynomials in the bivariate case over a triangular domain. This conversion is performed using the following formula, the formula being described in HUNGERBÜHLEP, R., AND GARLOFF, J. 1998, Bounds for the Range of a Bivariate Polynomial over a Triangle. *Reliable Computing*, 4, 1, 3-13:

$$p_{ij} = \sum_{l=0}^{i} \sum_{m=0}^{j} \frac{\binom{i}{l}\binom{j}{m}}{\binom{n}{l}\binom{n-l}{m}} a_{lm} \quad \text{equation (9)}$$

To compute a bounding box, simply the minimum and the maximum value over all $p_{ij}$ for each dimension, x, y, z, and w are computed. This gives a bounding box, $\hat{b}=(\hat{b}_x,\hat{b}_y,\hat{b}_z,\hat{b}_w)$, where each element is an interval, for example $\hat{b}_x=[\underline{b_x},\overline{b_x}]$.

In this approach, the positional bounds, normal bounds, and bounding volume derived above are used for applying different culling techniques on the groups of vertices.

In one embodiment, view frustum culling is performed using said positional bound or said bounding volume, step 341 FIG. 3*d*.

In one embodiment, occlusion culling is performed using said positional bound or said bounding volume, step 342 FIG. 3*d*.

In one embodiment, a third set of instructions is derived from said second set of instructions and said third set of instructions is executed for providing a normal bound, step 343 FIG. 3*d*.

In one embodiment, back-face culling is performed using at least one from the group of said normal bound, said positional bound, and said bounding volume, step 344 FIG. 3*d*.

In one embodiment, at least one of the steps 341, 342, and 344 is performed. The steps 341-344 do not have to be performed in the exact order disclosed.

The culling techniques disclosed below are not be construed as limiting but they are provided by way of example. A person skilled in the art would realise that back-face culling, occlusion culling, and view frustum culling may be performed using various different techniques than the ones described below.

View frustum culling is a culling technique based on the fact that only objects that will be visible, that is that are located inside the current view frustum, are to be drawn. The view frustum may be defined as the region of space in the modelled world that may appear on the screen. Drawing objects outside the frustum would be a waste of time and resources since they are not visible anyway. If an object is entirely outside the view frustum, it cannot be visible and can be discarded.

In one embodiment the positional bounds of the bounding volume are tested against the planes of the view frustum. Since the bounding volume, $\hat{b}$, is in homogeneous clip space, the test may be performed in clip space. A standard optimization for plane-box tests may be used, where only a single corner of the bounding volume, the bounding volume being a bounding box, is used to evaluate the plane equation. Each plane test then amounts to an addition and a comparison. For example, testing if the volume is outside the left plane is performed using: $\overline{b_x}+\overline{b_w}<0$. The testing may also be performed using the positional bounds, $\tilde{p}(u,v)=(\tilde{p}_x,\tilde{p}_y,\tilde{p}_z,\tilde{p}_w)$. Since these tests are time- and resource efficient, it is advantageous to let the view frustum test be the first test.

Back-face culling discards objects that are facing away from the viewer, that is the all normal vectors of the object are directed away from the viewer. These objects will not be visible and there is hence no need to draw them.

Given a point, p(u, v) on a surface, back-face culling is in general computed as:

$$c = p(u,v) \cdot n(u,v) \quad \text{equation (10)}$$

where n(u, v) is the normal vector at (u, v). If c>0, then p(u, v) is back-facing for that particular value of (u, v). As such, this formula can also be used to cull for example a triangle or a group of triangles such as triangles described by a group of vertices. The Taylor model of the dot product (see equations 7 and 10) is computed: $\tilde{c}=\tilde{p}(u,v)\cdot\tilde{n}(u,v)$. To be able to back-face cull, the following must hold over the entire triangle domain: $\tilde{c}>0$. The lower bound on $\tilde{c}$ is conservatively estimated again using the convex hull property of the Bernstein form. This gives an interval, $\tilde{c}=[\underline{c},\overline{c}]$, and the triangle or group of triangles can be culled if $\underline{c}>0$.

In another embodiment interval bounds are computed for the normals. for checking if the back-face condition is fulfilled.

The testing may also be performed using the positional bounds, $\tilde{p}(u,v)=(\tilde{p}_x,\tilde{p}_y,\tilde{p}_z,\tilde{p}_w)$ or alternatively, the bounding volume.

Occlusion culling implies that objects that are occluded are discarded. In the following, occlusion culling is described for a bounding box but a person skilled in the art would realise that it is possible to perform occlusion culling on other types of bounding volumes as well.

The occlusion culling technique is very similar to hierarchical depth buffering, except that only a single extra level is used (8×8 pixel tiles) in the depth buffer. The maximum depth value, $Z_{max}^{tile}$, is stored in each tile. This is a standard technique in GPUs used when rasterizing triangles. The clip-space bounding box, b, is projected and all tiles overlapping this axis-aligned box are visited. At each tile, the classic occlusion culling test is performed: $Z_{min}^{box} \geq Z_{max}^{tile}$, which indicates that the box is occluded at the current tile if the comparison is fulfilled. The minimum depth of the box, $Z_{min}^{box}$, is obtained from the clip-space bounding box, and the maximum depth of the tile, $Z_{max}^{tile}$, from the hierarchical depth buffer (which already exists in a contemporary GPU). Note that the testing can be terminated as soon as a tile is found to be non-occluded, and that it is straightforward to add more levels to the hierarchical depth buffer. The occlusion culling test can be seen as a very inexpensive pre-rasterization of the bounding box of the group of primitives to be rendered. Since it operates on a tile basis, it is less expensive than an occlusion query.

In another embodiment, the testing may also be performed using the positional bounds, $\tilde{p}(u,v)=(\tilde{p}_x,\tilde{p}_y,\tilde{p}_z,\tilde{p}_w)$.

In one embodiment, the culling process is replaceable. This implies that the vertex culling unit 214 may be supplied with a user-defined culling process.

Figure 4:
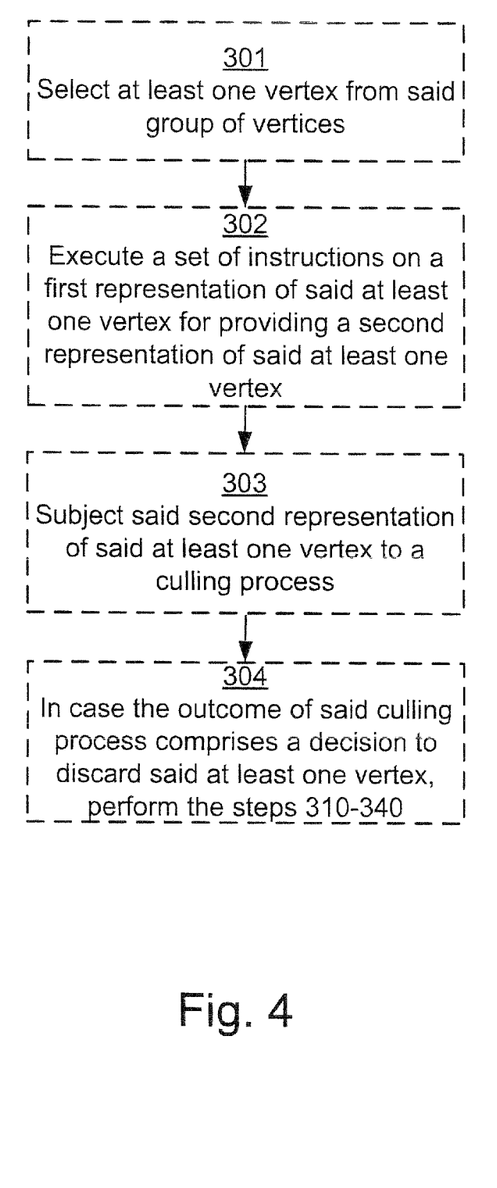
FIG. 4 is a flowchart showing the vertex probing process that can be executed in the vertex probing unit of FIGS. 2a-e.

FIG. 4 shows a Flow chart for a probing program that can be executed on at least one vertex in the vertex probing unit 212 of FIGS. 2*a, b, c, d,* and *e*.

At least one vertex is selected from the group of vertices, step 301. A set of instructions associated with vertex position determination are executed on a first representation of said at least one vertex for providing a second representation of said at least one vertex, step 302. The second representation of said at least one vertex is subject to a culling process, step 303, wherein an outcome of said culling process comprises one of a decision to discard said at least one vertex, and a decision not to discard said at least one vertex. In case the outcome of said culling process comprises a decision to discard said at least one vertex, the steps 310-340 are performed. The steps described in connection with FIG. 3*a-d* can be performed in the apparatus 201 of the invention or embodiments of the invention.

Figure 5:
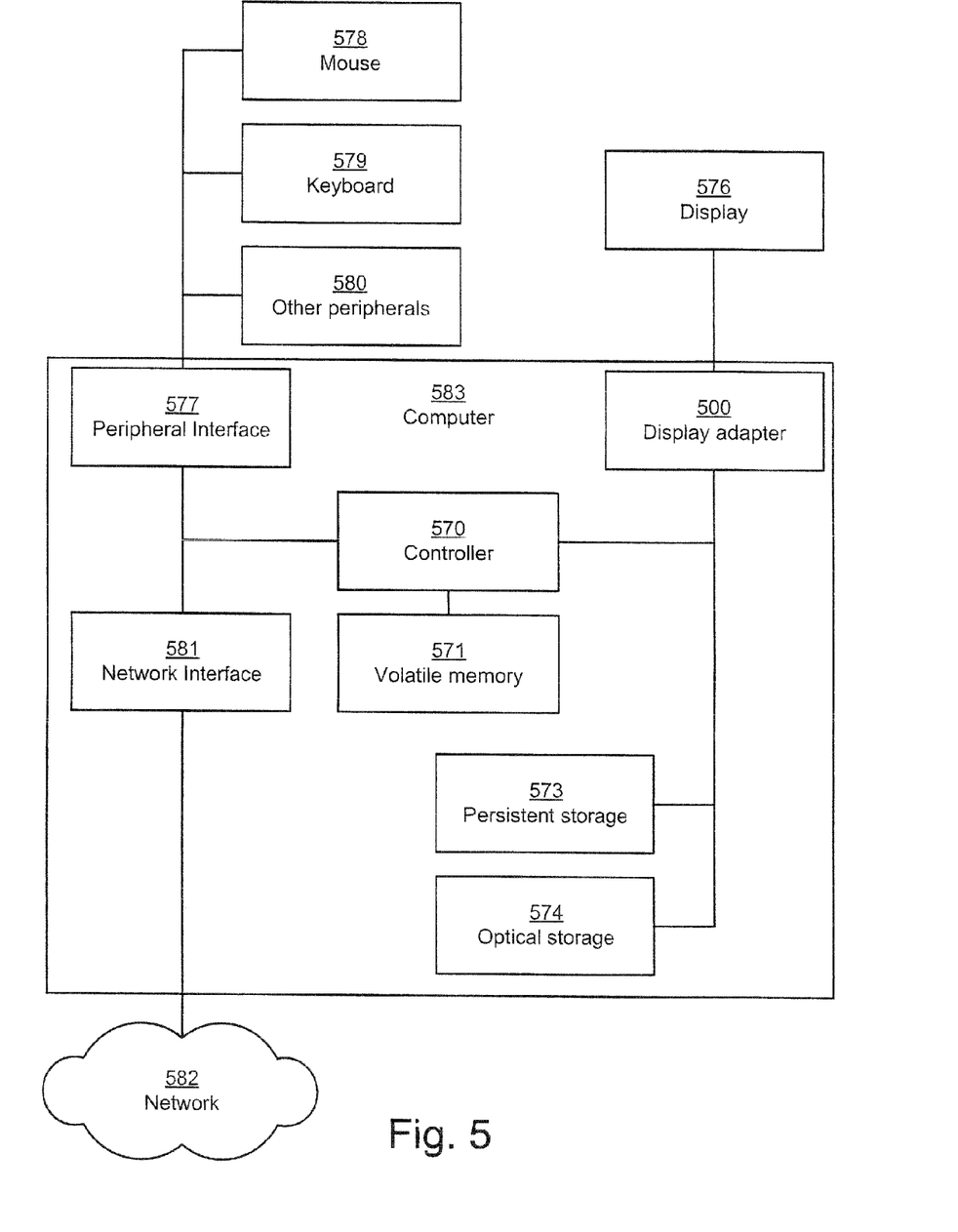
FIG. 5 shows an overview architecture of a typical general purpose computer embodying the apparatus of FIGS. 2a-e.

FIG. 5 shows an overview architecture of a typical general purpose computer 583 embodying the display adapter 201 of FIG. 2. The computer 583 has a controller 570, such as a CPU, capable of executing software instructions. The controller 570 is connected to a volatile memory 571, such as a random access memory (RAM) and a display adapter 500, the display adapter corresponding to the display adapter 201 of FIG. 2. The display adapter 500 is in turn connected to a display 576, such as a CRT monitor, an LCD monitor, etc. The controller 570 is also connected to persistent storage 573, such as a hard drive or flash memory and optical storage 574, such as reader and/or writer of optical media such as CD, DVD, HD-DVD or Blue-ray. A network interface 581 is also connected to the controller 570 for providing access to a network 582, such as a local area network, a wide area network (e.g. the Internet), a wireless local area network or wireless metropolitan area network. Through a peripheral interface 577, e.g. interface of type universal serial bus, wireless universal serial bus, firewire, RS232 serial, Centronics parallel, PS/2, the controller 570 can communicate with a mouse 578, a keyboard 579 or any other peripheral 580, including a joystick, a printer, a scanner, etc.

It is to be noted that although a general purpose computer is described above to embody various embodiments of the invention, the invention can equally well be embodied in any environment where digital graphics, and in particular 3D graphics, is utilized, e.g. game consoles, mobile phones, MP3 players, etc.

The invention may furthermore be embodied in a much more general-purpose architecture. The architecture may for example comprise many small processor cores that can execute any type of program. This implies a kind of a software GPU, in contrast to more hardware-centric GPU:s.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method comprising:
    receiving a first representation of a group of vertices;
    selecting a single vertex from said group of vertices;
    determining if said single selected vertex should be culled without testing the remaining vertices in the group;
    if not, refraining from culling said group based only on the determination of whether said selected vertex should be culled;
    otherwise, determining a second representation of said group of vertices based on said first representation using bounded arithmetic, wherein said second representation is positional bound or normal bound;
    executing a first set of vertex culling instructions on said second representation of said group of vertices for providing a third representation of said group of vertices that is a bounding volume, positional bound or normal bound; and
    subjecting said third representation of said group of vertices to a culling process.

2. The method according to claim 1, wherein said bounded arithmetic is at least one from the group of Taylor arithmetic, interval arithmetic, and affine arithmetic.

3. The method according to claim 1, wherein said group of vertices comprises vertices from at least two primitives.

4. The method according to claim 1, wherein said group of vertices comprises vertices that are associated with the same set of instructions associated with vertex position determination.

5. The method according to claim 1, further comprising deriving said first set of instructions from a second set of instructions associated with vertex position determination.

6. The method according to claim 5, further comprising:
    deriving a third set of instructions from said second set of instructions, and
    executing said third set of instructions for providing a normal bound.

7. The method according to claim 1, wherein said receiving of a first representation further comprises:
    if the number of vertices in said group of vertices exceeds a threshold value,
    dividing said group of vertices into at least two subgroups;
    wherein said at least two subgroups comprise vertices that are associated with the same set of instructions associated with vertex position determination.

8. The method according to claim 1, wherein said determining a second representation further comprises:
    computing said second representation of said group of vertices, and
    storing said second representation of said group of vertices in a memory.

9. The method according to claim 1, wherein said determining a second representation further comprises:
    retrieving said second representation of said group of vertices from a memory.

10. The method according to claim 1, further comprising:
    selecting at least one vertex from said group of vertices,
    executing a set of instructions associated with vertex position determination on a first representation of said at least one vertex for providing a second representation of said at least one vertex;
    subjecting said second representation of said at least one vertex to a culling process, wherein an outcome of said culling process comprises one of:
    a decision to cull said at least one vertex;
    a decision not to cull said at least one vertex;
    in case the outcome of said culling process comprises a decision to cull said at least one vertex, perform
    said receiving a first representation of a group of vertices;
    said determining a second representation of said group of vertices;
    said executing a set of instructions associated with vertex position determination on said second representation of said group of vertices for providing a third representation of said group of vertices; and
    said subjecting said third representation of said group of vertices to a culling process.

11. The method according to claim 10, further comprising:
    determining a bounding volume enclosing said third representation of said group of vertices; and
    subjecting said bounding volume to a culling process.

12. The method according to claim 11, wherein subjecting said bounding volume to said culling process further comprises performing at least one of:
- subjecting said bounding volume to view frustum culling;
- subjecting said bounding volume to back-face culling; and
- subjecting said bounding volume to occlusion culling.

13. The method according to claim 11, wherein said third representation is at least one from the group of a positional bound and a normal bound.

14. The method according to claim 13, wherein subjecting said third representation to said culling process further comprises performing at least one of:
- subjecting said positional bound to view frustum culling;
- subjecting said positional bound or said normal bound to back-face culling; and
- subjecting said positional bound to occlusion culling.

15. A non-transitory computer readable medium storing instructions to enable a computer to:
- receive a first representation of a group of vertices;
- select a single vertex from said group of vertices;
- determine if said single selected vertex should be culled without testing the remaining vertices in the group;
- if not, refrain from culling said group based only on the determination of whether said selected vertex should be culled;
- otherwise, determine a second representation of said group of vertices based on said first representation using bounded arithmetic, wherein said second representation is positional bound or normal bound;
- execute a first set of vertex culling instructions on said second representation of said group of vertices for providing a third representation of said group of vertices that is a bounding volume, positional bound or normal bound; and
- subject said third representation of said group of vertices to a culling process.

16. The medium according to claim 15, wherein said bounded arithmetic is at least one from the group of Taylor arithmetic, interval arithmetic, and affine arithmetic.

17. The medium according to claim 15, wherein said group of vertices comprises vertices from at least two primitives.

18. The medium according to claim 15, wherein said group of vertices comprises vertices that are associated with the same set of instructions associated with vertex position determination.

19. A display adapter comprising:
- a vertex shader; and
- a vertex culling unit to receive a first representation of a group of vertices, select a single vertex from said group of vertices, determine if said single selected vertex should be culled without testing the remaining vertices in the group; if not, refrain from culling said group, otherwise determine a second representation of said group of vertices based on said first representation using bounded arithmetic, whether said second representation is positional bound or normal bound, execute a first set of vertex culling instructions on said second representation of said group of vertices for providing a third representation of said group of vertices that is a bounding volume, positional bound or normal bound, and subject said third representation of said group of vertices to a culling process based only on the determination of whether said selected vertex should be culled.

* * * * *